Jan. 14, 1958  R. W. EDWARDS  2,819,893
APPARATUS FOR CONTROLLING THE UNLOADING OF A SPRING
Filed March 5, 1956  3 Sheets-Sheet 1
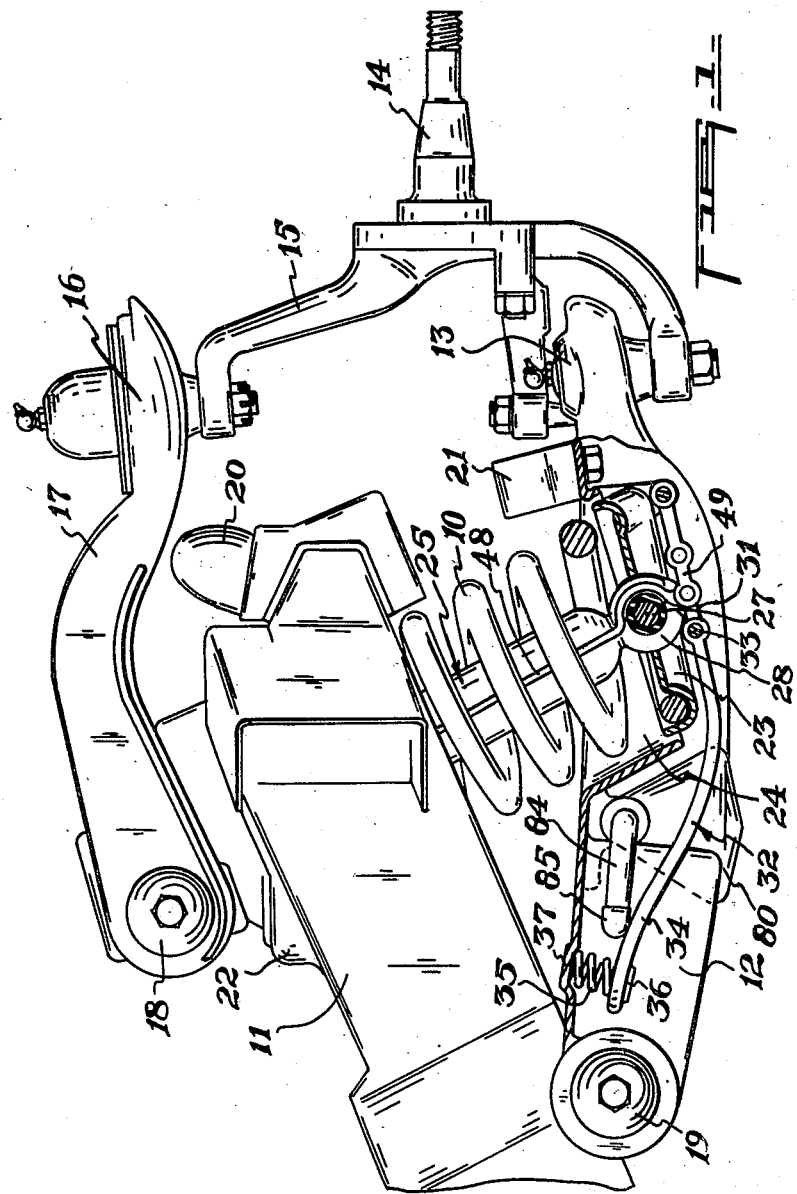
INVENTOR
ROBERT W. EDWARDS
By Fetherstonhaugh & Co.
ATTORNEYS Jan. 14, 1958  R. W. EDWARDS  2,819,893
APPARATUS FOR CONTROLLING THE UNLOADING OF A SPRING
Filed March 5, 1956  3 Sheets-Sheet 2
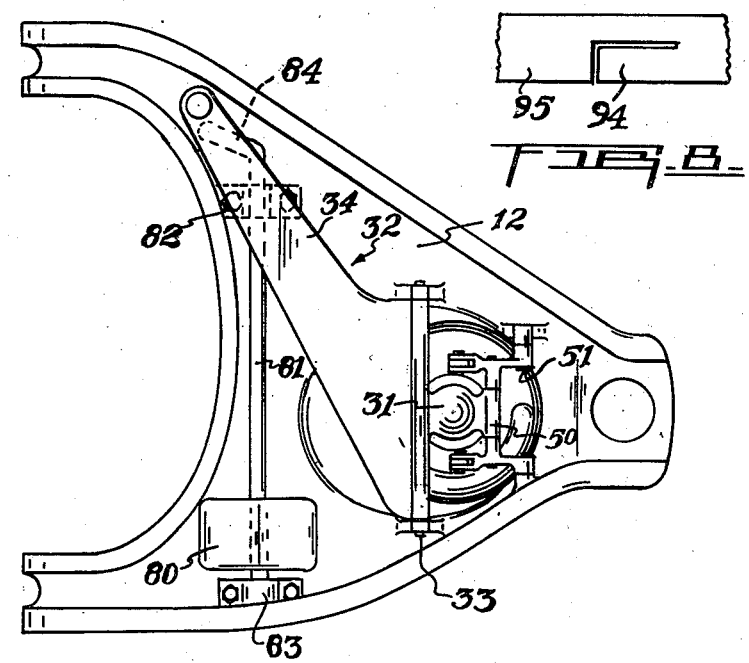
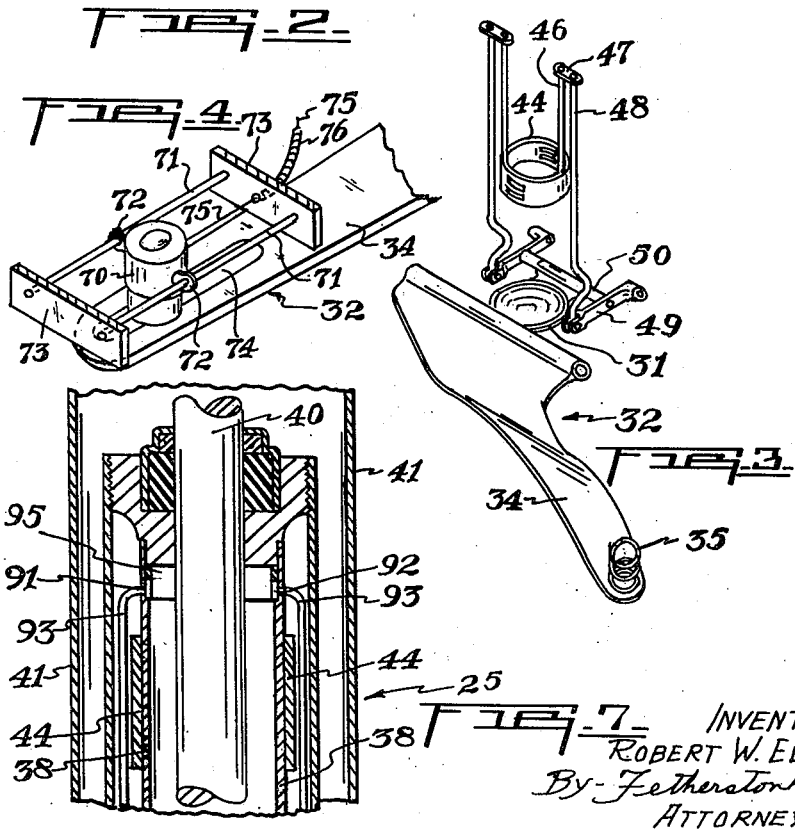
INVENTOR
ROBERT W. EDWARDS
By Featherstonhaugh & Co.
ATTORNEYS Jan. 14, 1958   R. W. EDWARDS   2,819,893
APPARATUS FOR CONTROLLING THE UNLOADING OF A SPRING
Filed March 5, 1956   3 Sheets-Sheet 3
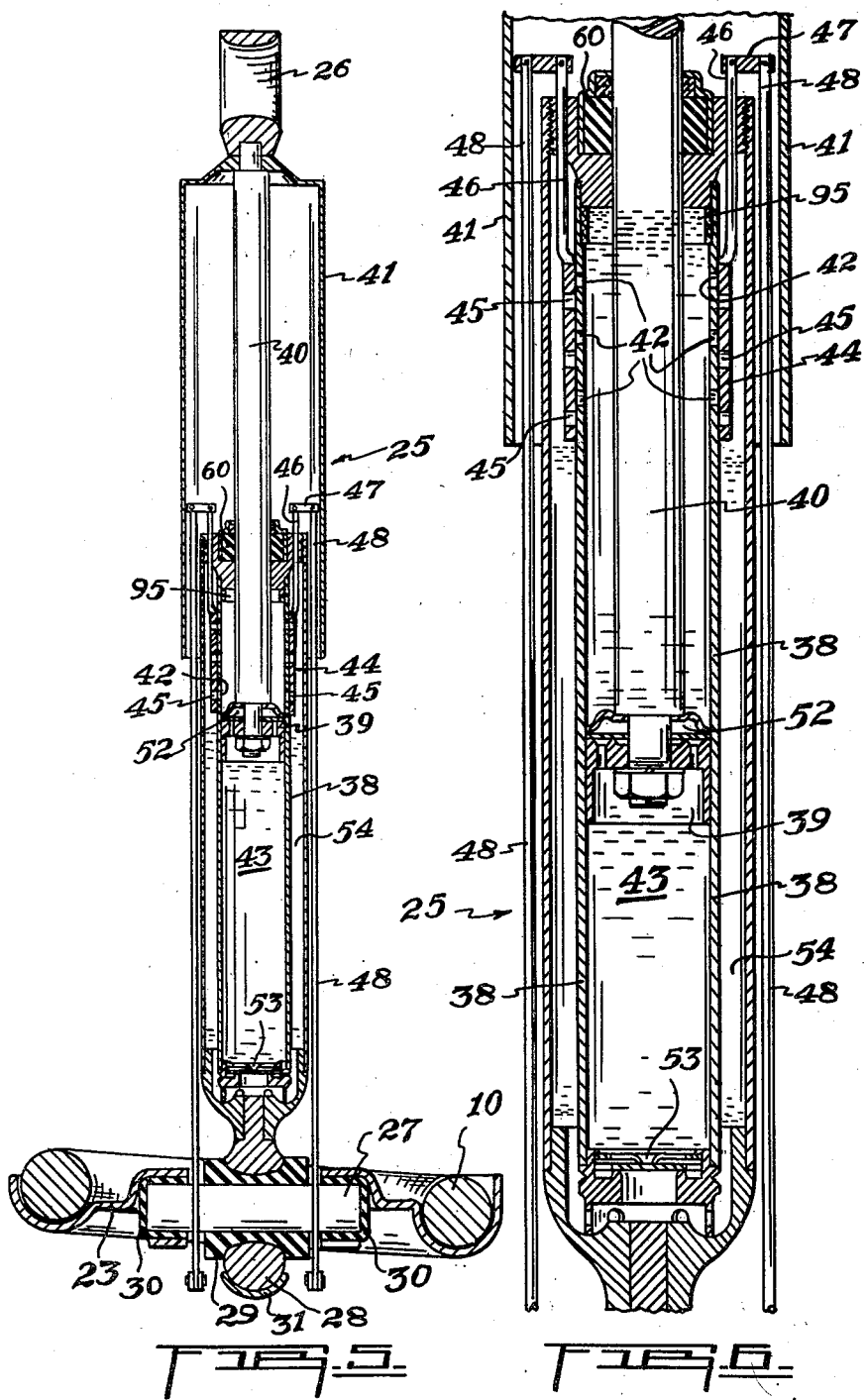
INVENTOR
ROBERT W. EDWARDS
By Fetherstonhaugh & Co.
ATTORNEYS United States Patent Office 2,819,893
Patented Jan. 14, 1958

2,819,893

APPARATUS FOR CONTROLLING THE UNLOADING OF A SPRING

Robert W. Edwards, Midland, Ontario, Canada

Application March 5, 1956, Serial No. 569,497

9 Claims. (Cl. 267—8)

The present invention relates to apparatus for controlling the unloading of a spring and is particularly concerned with the unloading of a spring which is subject to a heavy load such as is the case of the spring in the wheel suspension of an automobile.

The word "spring" is used in this specification to mean any elastic or resilient device which can store and release energy.

Prior to the present invention there have been various proposals for shock absorbers to be used in conjunction with the wheel suspension of an automobile, but in many cases these shock absorbers have not provided as satisfactory results as is desirable. The prior art has provided dashpot type of shock absorbers connected through various means to the axle and to the chassis of the automobile. These shock absorbers have been designed to damp oscillation of the automobile body after the main spring has been compressed and has released the forces stored in it due to compression. The most serious disadvantage of the previous arrangements is that the initial rebound of the spring which releases the great amount of energy stored in it often causes a severe shock in the body of the automobile even though continued oscillation of the automobile is prevented.

According to the present invention shock due to the initial rebound of a compressed spring is prevented. Apparatus according to the present invention comprises a spring to be controlled which is arranged to provide resilience between a first and second relatively movable loadable means. A lever means is pivoted to the second loading means so that the lever means is divided into two lever arms. One of the lever arms is arranged to apply loading force from the second loading means to the spring to be controlled in opposition to the force applied by the first loading means. A second spring is arranged to act against the other lever arm so that the second spring becomes loaded when the spring to be controlled is loaded. Means controlled by movement of the lever means upon loading of the spring to be controlled is provided to hold the spring to be controlled in its loaded state and to release same as the second spring is unloaded. The strength of the second spring multiplied by the mechanical advantage provided by the lever arms of the lever means is sufficient when the spring to be controlled is loaded to move the first loading means relative to the second loading means.

The invention may be applied to the wheel suspension of an automobile by having the first loading means connected to the chassis of the automobile and the second loading means connected to a wheel spindle of the automobile. In the case of a front wheel suspension the invention may be applied to the conventional parallelogram mechanism and the spring to be controlled may be a coiled compression spring of the usual type.

The means controlled by movement of the lever means to hold the spring to be controlled in its loaded state is preferably a hydraulic cylinder having a piston adapted to reciprocate and to trap hydraulic fluid within the cylinder upon movement in one direction thereby preventing further movement in that direction. Valve means is provided for venting the trapped hydraulic fluid from the cylinder thereby permitting further movement of the piston, the valve means being controlled by movement of the lever means.

In a preferred form of the invention a pendulum is provided and arranged to supplement the force applied by the second spring to the lever means in case of leaning of the vehicle as may occur in the case of a vehicle travelling about a curve.

In another preferred form of the invention means is provided for adjusting the position of the second spring with respect to the pivot means, thereby changing the length of the lever arm against which the second spring acts. This adjustment permits control of the amount of compression of the second spring according to the size of the load being carried by the spring to be controlled.

Apparatus according to the invention permits the spring to be controlled to be loaded in a normal manner but upon the spring assuming its full load it is temporarily locked in its compressed state so that it cannot rebound with resultant shock. However, as soon as the spring to be controlled is under full load the second spring through the lever arms provided by the lever means begins to release its stored energy by forcing apart the two loading means and at the same time acting to release the means which is locking the spring to be controlled in its loaded state. If the spring to be controlled tends to release its stored energy suddenly it will again be locked through the action of the lever means and the second spring once more will begin to release energy thereby allowing the spring to be controlled to release a further amount of its energy. In this way the spring to be controlled is unloaded in a controlled manner so that there is no sudden rebound.

The invention will be further described with reference to the accompanying drawings showing a preferred embodiment, and in which:

Figure 1 is a side view of apparatus according to the invention as applied to the front wheel suspension of an automobile, Figure 2 is a plan view of part of the front wheel suspension shown in Figure 1, taken from the bottom, Figure 3 is a perspective view of a subassembly showing the lever means and its associated linkage, Figure 4 is a perspective view showing an arrangement of the second spring whereby it can be adjusted along the lever means, Figure 5 is a sectional view of the hydraulic control means showing the relative positions of its parts when the spring to be controlled is unloaded, Figure 6 is a sectional view of the hydraulic control means to a larger scale than used in Figure 5 and showing the relative positions of its parts when the spring to be controlled is locked in its loaded condition, Figure 7 is a sectional view showing details of part of the hydraulic control means shown in Figures 5 and 6, and Figure 8 is a detail view of one of the one-way valves shown in Figure 7.

Referring to Figure 1 of the drawings, the apparatus shown is arranged to control the unloading of a coiled compression type spring 10 which is arranged to provide resilience in the front wheel suspension of an automobile having two relatively movable loading means 11 and 12. The loading means 11 is a part of the chassis of the automobile and the loading means 12 is the lower control arm of the front wheel suspension which connects through a conventional type of joint 13 to a spindle 14 for a front wheel. The spindle 14 is mounted on a post 15 which connects through a conventional joint 16 to the upper control arm 17 of the parallelogram mechanism. The upper control arm 17 connects through a conventional joint 18 to the chassis 11 and the lower control arm 12 connects through a conventional joint 19 to the chassis 11. The usual rubber bumpers 20 and 21 are provided to limit the degree of deflection of the parallelogram which can occur.

The spring 10 is fixed between a seat 22 in the chassis 11 and a seat 23 which floats in an opening 24 in the lower control arm 12. An hydraulic control means 25 is centrally arranged within the spring 10 and at one end is pinned through an eye 26 (Figure 5) to the chassis 11, and at the other end is connected by a pin 27 through an eye 28 to the seat 23 (see Figures 1 and 5). The pin 27 is cushioned by a rubber grommet 29 and rubber caps 30. The eyes 26 and 28 of the hydraulic control means 25 and their fastening means are of similar construction to that used to fasten conventional shock absorbers.

The lower curved surface of the eye 28 is seated in a seat 31 which forms a part of a lever 32 as shown in Figures 1, 2 and 3. The lever 32 is attached by a pivot 33 to the lower control arm 12 thereby dividing the lever 32 into two lever arms of which one is the seat 31 and the other lever arm 34 extends along the underneath side of the lower control arm 12 to a second spring 35. The spring 35 is seated between the seat 36 (Figure 1) in the lever arm 34 and a seat 37 in the lower control arm 12.

The hydraulic control means 25 is shown in detail in Figures 5 and 6 and comprises a cylinder 38 having a piston 39 arranged for reciprocation within it. The piston 39 is connected by a shaft 40 to the eye 26 and to an external sleeve 41 which serves as a telescopic canopy for the hydraulic control means to prevent entry of foreign matter. The wall of the cylinder 38 has ports 42 through which the hydraulic fluid 43 can pass. A sleeve 44 is fitted about the external wall of the cylinder 38 and has ports 45 corresponding to the ports 42 in the cylinder 38. The arrangement of the ports is such that sliding of the sleeve 44 on the cylinder 38 opens and closes the ports by degrees. The sleeve 44 is connected by links 46, 47, 48 and 49 to the seat 31 of the lever 32 (see Figures 1, 2 and 3). Rigid connections are provided between the links 46, 47 and 48 but the other connections between the links are connections which permit pivoting. The seat 31 of the lever 32 is connected to the links 49 by a pin 50, and the links 49 are connected by pivots 51 to the lower control arm 12 (Figures 2 and 3). This arrangement provides that upon upward movement of the lower control arm 12 which tends to load the spring 10 the seat 31 of the lever 32 is forced downward by the eye 28 which is pinned to the seat 23 for the spring 10. This causes the lever 32 to pivot about its pivot 33 so that the lever arm 34 moves upward causing the second spring 35 to be compressed. At the same time the downward movement of the seat 31 causes pivoting of the links 49 in a downward direction and this results in the sleeve 44 being moved downward along the outer wall of the cylinder 38 closing the ports 42 in the cylinder 38 thereby preventing escape of the hydraulic fluid 43 from above the piston 39. It is to be noted that clearance must be provided to permit connection of the lever 32 to the links 49 so that binding does not occur during the pivoting action. This can be done by mounting at least one of the pivotal connections in rubber which is a well known expedient. As shown in Figures 5 and 6 one-way valves 52 and 53 are provided in the piston 39 and the bottom of the cylinder 38 respectively to permit a predetermined rate of flow of hydraulic fluid 43 through the piston 39 when it moves downward and to prevent flow of hydraulic fluid through the piston 39 when it moves upward. The valve 53 is a one-way valve permitting entry of hydraulic fluid 43 into the cylinder 38 from a reservoir 54 as required by movement of the piston 39. A conventional type of packing gland 60 is fitted to the shaft 40 at the upper end of the cylinder 38. The gland 60 has the usual arrangement of a small orifice to drain back any leakage oil to the reservoir 54.

Two one-way valves 91 and 92 (Figure 7) may be provided at the top of the cylinder 38 to permit entry of hydraulic fluid to the cylinder 38 above the piston 39 as required during downward movement of the piston 39. Each of valves 91 and 92 is fitted with a pipe 93 extending down into the hydraulic fluid in the reservoir 54. The flaps 94 of the one-way valves 91 and 92 are formed in a conventional manner in a ring 95 of spring steel as indicated by Figure 8.

In operation the apparatus acts to prevent severe shock due to rebound of the spring 10 being transmitted to the chassis 11 after the spring 10 has been compressed by upward movement of the wheel spindle 14 as would be the case when the wheel strikes a bump. As the wheel spindle 14 moves in an upward direction, it carries with it the post 15, the upper control arm 17 and the lower control arm 12, upward movement of the lower control arm 12 acts through the lever 32 against the eye 28 of the hydraulic control means 25. The eye 28 being pinned to the spring seat 23 causes force to be applied to the spring 10 so that it becomes compressed between the seat 23 and its seat 22 which is a part of the chassis 11.

While the spring 10 is being loaded as described above, the force applied to the lever 34 by upward movement of the control arm 12 and by the resistance offered by the eye 28 of the hydraulic control means 25 causes the lever 34 to pivot about its pivot point 33 so that the second spring 35 is compressed between its seats 36 and 37.

The pivoting motion of the lever 32 also causes the links 49 (Figures 2 and 3) to pivot, thereby causing downward movement of the links 48 so that the sleeve 44 is forced to move in a downward direction about the cylinder 38 (Figures 3, 5 and 6). As shown in Figure 5, prior to loading of the spring 10, the ports 45 in the sleeve 44 are aligned with the ports 42 in the cylinder 38 so that the hydraulic fluid 43 is free to pass from the part of the cylinder 38 above the piston 39 to the reservoir 54. As shown in Figure 6, movement of the sleeve 44 in a downward direction closes the ports 42 in the cylinder 38 so that the hydraulic fluid 43 in the part of the cylinder 38 above the piston 39 is trapped. During this action the one-way valve 52 in the piston 39 acts to permit hydraulic fluid to flow at a predetermined rate into the part of the cylinder 38 above the piston 39 but prevents reverse flow of this fluid. The action of the one-way valve 52 in limiting the rate of flow of hydraulic fluid through the piston 39 is similar to the action of a conventional shock absorber. However, this is as far as the similarity goes because with the parts of the hydraulic control means in the relative positions shown in Figure 6, the piston 39 is locked against further movement in an upward direction relative to the cylinder 38. As shown in Figure 1, the piston 39 is connected to the chassis 11 while the cylinder 38 is connected to the spring seat 23 so that upon loading (compression) of the spring 10 the hydraulic control means 25 serves to lock the spring 10 in its loaded condition. This prevents sudden rebound of the spring 10 to release its energy which would, if permitted, cause severe shock to the chassis 11.

As soon as the spring 10 is locked in its compressed condition by the hydraulic control means 25, the second spring 35 acting through the lever arms of the lever 32 begins to release the energy stored in the spring 10. The spring 35 is of such a strength as to lift the chassis 11 relative to the lower control arm 12 while acting through the lever arms of the lever 32. The pivoting movement of the lever 32 caused by the spring 35 causes the links 49

(Figure 3) to pivot in an upward direction thereby causing the sleeve 44 in the hydraulic control unit 25 (Figures 5 and 6) to move in an upward direction thereby causing at least a slight overlapping of the ports 45 and the ports 42 so that hydraulic fluid 43 which was trapped above the piston 39 begins escaping through the ports 42 and 45. This permits the piston 39 to rise slowly within the cylinder 38 thereby permitting the spring 10 to extend gradually while releasing its stored energy. Any tendency for the spring 10 to rebound suddenly to release its stored energy is prevented because such a sudden rebound of the spring would act downward against the seat 31 in the lever 32 and would cause recompression of the spring 35 and closing of the ports 42. In this way by degrees the energy stored in the spring 10 is released without any sudden shock being transmitted to the chassis 11.

It may be desired in the case of application of the invention, for example to a vehicle such as an automobile, to provide means which in effect strengthens the spring 35 in the event of leaning of the vehicle causing the weight of the chassis 11 to be thrown outward toward the wheel spindle 14. As shown in Figures 1 and 2, this can be accomplished in a convenient manner by providing a pendulum 80 suspended from a rod 81 extending across the lower control arm 12 and supported by bearings 82 and 83. One end of the rod 81 forms a crank 84 which is fitted with a rubber tip 85 normally located just above the lever 34 and close to the spring 35. If the vehicle is subjected to centrifugal force in the direction of the wheel spindle 14, it will tend to lean and apply additional weight to the spring 10 and consequently to the spring 35. This centrifugal force will also cause the pendulum 80 to swing toward the wheel spindle 14 so that the rubber tip 85 of the bell crank 84 will press downward against the lever arm 34 thereby aiding the action of the spring 35 in resisting the additional force thrown against it by leaning of the vehicle.

As mentioned above, the lengths of the lever arms of the lever 32 and the design of the spring 35 depend upon the weight to be supported in this area of the chassis 11. It may be desired to use a standard design of spring and of the lever for different weights applied to the chassis 11 and this can be done as shown in Figure 4 by arranging for the position of the spring 35 to be adjustable along the lever arm 34 of the lever 32. Also it may be desirable to place this feature under the control of the operator of the vehicle so that he can adjust the position of each spring 35 according to the distribution of load in the vehicle. As shown in Figure 4, the spring 35 is enclosed in a telescopic capsule 70 arranged to slide back and forth on the lever arm 34 of the lever 32 by means of provision of a pair of tracks 71 and bearings 72 attached to the capsule 70. The tracks 71 are supported from brackets 73 which are fixed to the lower control arm 12. Groove 74 is provided in the lever 32 to fit a dimple in the end of the capsule 70 and a similar arrangement is at the other end of the capsule which slides against the under-surface of the lower control arm 12. A flexible cable 75 connects to the capsule 70 and is led through a bracket 73 and a flexible sheath 76 to a position within the reach of the operator of the vehicle. With this arrangement the operator of the vehicle can use the flexible shaft 75 to move the capsule 70 back and forth along the lever arm 34 thereby adjusting the position of the spring 35 and the force which it is able to transmit through the lever 32 to the spring seat 23.

The embodiment of the invention shown in the drawings is suitable for application to an automobile having coil springs but it is within the mechanical skill in this art to apply the invention to other types of springs for example, leaf springs. The invention may be applied to any type of vehicle and may find other uses than in vehicles in view of the advantages of the invention in connection with controlling the unloading of any spring arranged to provide resilience between two relatively movable loading means.

What I claim as my invention is:

1. Apparatus for controlling the unloading of a spring comprising, a spring to be controlled, a first and a second loading means connected to apply loading force to the spring to be controlled, a lever means, pivot means engaging the lever means to the second loading means and forming two lever arms of the lever means, one of said lever arms connected to the spring to be controlled to apply loading force from the second loading means in opposition to the force applied by the first loading means, a second spring connected between the second loading means and the other of said lever arms so as to be loaded when the spring to be controlled is loaded, and means controlled by movement of the lever means upon loading of the spring to be controlled to hold the spring to be controlled in its loaded state and to release same as the second spring is unloaded; the strength of the second spring acting through the lever means being sufficient when the spring to be controlled is loaded to act through said means controlled by movement of the lever means to move the first loading means relative to the second loading means.

2. Apparatus as claimed in claim 1 in which the spring to be controlled is a coil type compression spring acting between the first loading means and a spring seat, the means controlled by movement of the lever means acting between the first loading means and the spring seat.

3. Apparatus as claimed in claim 2 in which the means controlled by movement of the lever means comprises, a hydraulic cylinder, a piston adapted to reciprocate within said cylinder, said cylinder being connected to the lever means and said piston being connected to the first loading means, said piston having valve means adapted to trap hydraulic fluid upon movement of the piston in one direction thereby to oppose further movement in that direction while holding the spring to be controlled in its loaded state, said cylinder having valve means for venting the trapped hydraulic fluid thereby permitting further movement of said piston in said one direction, said valve means being controlled by movement of the lever means, and means for supplying hydraulic fluid to said cylinder.

4. Apparatus as claimed in claim 3 in which the valve means comprises at least one port in the wall of the cylinder, a sleeve surrounding said cylinder and adapted to slide thereover to close and open said port; said apparatus comprising linkage connecting said sleeve to the lever means for movement thereby.

5. Apparatus as claimed in claim 1 in which the first loading means is connected to the chassis of a vehicle having wheels and the second loading means is connected to a spindle for a wheel of said vehicle.

6. Apparatus as claimed in claim 5 in which the chassis and the two loading means are included in a parallelogram mechanism acting as a wheel suspension of the vehicle, the spring to be controlled being a coiled compression spring arranged to provide resilience for said wheel suspension.

7. Apparatus as claimed in claim 6 in which the means controlled by movement of the lever means comprises, a hydraulic cylinder, a piston adapted to reciprocate within said cylinder, said cylinder being connected to the lever means and said piston being connected to the first loading means, said piston having valve means adapted to trap hydraulic fluid upon movement of the piston in one direction thereby to oppose further movement in that direction while holding the spring to be controlled in its loaded state, said cylinder having valve means for venting the trapped hydraulic fluid thereby permitting further movement of said piston in said one direction, said valve means being controlled by movement of the lever means, and means for supplying hydraulic fluid to said cylinder.

8. Apparatus as claimed in claim 1 in which the first loading means is connected to the chassis of a vehicle and the second loading means is connected to a spindle of said vehicle, said apparatus comprising a pendulum pivotally supported from the second loading means and adapted to act against the lever means to supplement the force applied by the second spring to the lever means upon swaying of the chassis toward the spindle.

9. Apparatus as claimed in claim 1 comprising means for adjusting the position of the second spring with respect to the pivot means thereby changing the length of the lever arm against which the second spring acts.

References Cited in the file of this patent

UNITED STATES PATENTS

| | | |
|---|---|---|
| 2,650,108 | Bruce | Aug. 25, 1953 |
| 2,712,946 | Cicero | July 12, 1955 |

FOREIGN PATENTS

| | | |
|---|---|---|
| 121,688 | Switzerland | Oct. 1, 1927 |